United States Patent

[11] 3,588,273

| [72] | Inventor | Apostolos P. Kizilos |
| | | Minnetonka, Minn. |
| [21] | Appl. No. | 808,490 |
| [22] | Filed | Mar. 19, 1969 |
| [45] | Patented | June 28, 1971 |
| [73] | Assignee | Honeywell Inc. |
| | | Minneapolis, Minn. |

[54] CONTROL APPARATUS
10 Claims, 4 Drawing Figs.

[52] U.S. Cl. .................................................. 416/42,
416/20, 416/23, 416/90
[51] Int. Cl. ..................................................... B64c 27/72
[50] Field of Search .......................................... 416/4, 20,
31, 42, 90, 98, 117, 118, 119, 23, 37, 24, 40

[56] References Cited
UNITED STATES PATENTS

| 3,062,483 | 11/1962 | Davidson .................... | 416/90X |
| 3,209,714 | 10/1965 | Bowles ....................... | 416/90X |
| 3,367,581 | 2/1968 | Kizilos et al. ................ | 416/90 |

FOREIGN PATENTS

| 890,630 | 9/1953 | Germany ..................... | 416/42 |

Primary Examiner—Everette A. Powell, Jr.
Attorneys—Charles J. Ungemach, Ronald T. Reiling and Charles L. Rubow ABSTRACT: A sectionalized airfoil for an aircraft, each section of which includes local airflow sensors, control means, and jet flap means for controlling the lift produced by the section. The present invention has particular application to rotary-wing aircraft wherein each rotor blade section may include variable deflection thruster jet flap means operable to control the lift produced by each section.

INVENTOR.
APOSTOLOS P. KIZILOS
BY Ronald T. Reiling
ATTORNEY

INVENTOR.
APOSTOLOS P. KIZILOS
BY Ronald T. Reiling
ATTORNEY

CONTROL APPARATUS

BACKGROUND OF THE INVENTION

This invention relates generally to controllable airfoils, more particularly to airfoils wherein the amount of lift produced can be controlled by means of a jet flap.

It is known in the art that the airflow field around an airfoil may be modified by the issuance of high energy fluid streams or sheets from outlets or slots in the airfoil. Such a fluid stream used in conjunction with a mechanical flap is known as a blown flap, while the fluid stream or sheet used without a mechanical flap is known as a jet flap or pure jet flap.

The present invention utilizes jet flap means to provide a unique controllable airfoil. While the present invention may advantageously be applied to all airfoils, it is particularly well adapted for application to rotary-wing aircraft and will be so described hereinafter.

Presently, maximum useable airspeed in helicopters is limited to about 200 knots, because of loss of lift and other problems encountered with helicopter rotors at high speeds. At any given instant, one or more rotor blades, referred to as "the advancing blade," are in the part of their rotation cycle where the effective airspeed experienced is the sum of their rotational velocity and the helicopter's forward airspeed. At the same time, the blade or blades mounted on the rotor opposite the advancing blade experience an effective airspeed equal to their rotational velocity less the forward airspeed of the helicopter. These blades are referred to as "the retreating blade." It will be appreciated that as helicopter forward airspeed increases, the effective airspeed at the advancing blade increases, while the effective airspeed at the retreating blade decreases. Since the contribution to total effective airspeed of the rotor blade due to the blade's rotational velocity is a function of the radial distance from the rotor hub, the point on the rotor experiencing the highest total effective airspeed is at the tip of the advancing blade, while the lowest total effective airspeed will be found near the root of the retreating blade. Both of these effects lead to problems at high speeds.

The main problem associated with the rotor when the helicopter is at high airspeed involves loss of lift on the retreating rotor blade, due to low effective airspeed and high angle of attack. The angle of attack of the retreating blade is increased at high helicopter airspeed because the induced velocity becomes large in relation to the oncoming free stream velocity. When the angle of attack reaches about 14° the airfoil section stalls and the lift is appreciably reduced. The low effective airspeed experienced by the retreating blade when the helicopter is at high airspeed also contributes to loss of lift. At still higher helicopter airspeeds a portion of the retreating blade near the rotor hub actually experiences reverse flow, i.e. airflow from trailing edge to leading edge, because the helicopter forward airspeed exceeds the product of rotational velocity times distance from the rotor hub. This region of reverse flow extends further outward on the retreating blade as helicopter airspeed continues to increase. Heretofore, this region has been relatively useless for producing lift, and in fact has contributed to much buffeting and vibration of the rotor blade.

The net result of the effects above described is a reduction in the total lift produced by the rotor, which may leave insufficient lift to support the helicopter in flight, and an unbalanced lifting moment on the rotor produced by the low lift of the retreating blade and the high lift of the advancing blade, which may lead to severe control problems.

Increasing rotor rotational velocity in an attempt to alleviate retreating blade stall is not possible, because to do so would cause the tip of the advancing blade to approach the speed of sound. It is not feasible for helicopters to operate with blade tips approaching the speed of sound because of the compressibility effects characteristic of transonic speeds which result in high drag forces, severe buffeting, and vibration of the rotor blade which may lead to structural failure. Nor is it feasible to merely decrease rotor diameter to avoid compressibility effects at the advancing blade tip, because to do so would only serve to further reduce lift.

Thus, the problem facing helicopters at high airspeeds is seen to be two-fold; loss of lift on the retreating blade and compressibility effects on the advancing blade. It has been demonstrated that compound helicopters, i.e. aircraft which employ both lifting rotors and auxiliary fixed wings, can obtain higher airspeeds than can pure helicopters. However, compound helicopters do not solve the problems previously mentioned, but merely forestall their onset to a slightly higher airspeed. Although loss of lift due to retreating blade stall and/or reverse flow is initially not as serious in a compound helicopter because of the compensating lift produced by the fixed airfoils at high airspeeds, such an aircraft is still subject to severe buffeting and vibration due to blade stall and/or reverse flow and due to near sonic flow at the advancing blade tips, and its maximum airspeed is ultimately limited thereby.

Applicant's unique invention, while applicable to both fixed and rotary-wing aircraft, is particularly adapted for increasing the maximum airspeed of rotary-wing aircraft by diminishing the loss of lift of the retreating rotor blades.

SUMMARY OF THE INVENTION

Applicant's invention comprises sensing means for sensing local airflow conditions at a plurality of positions along an airfoil, fluid outlet means positioned along the airfoil for forming a jet flap, and control means operable to vary the flow of fluid from the fluid outlet means according to the local airflow conditions sensed. Varying the fluid flow from the fluid outlet means is effective to vary the strength and/or direction of the jet flap, which in turn is effective to control the lift produced by the airfoil.

DESCRIPTION OF THE PREFERRED EMBODIMENTS

Figure 1:
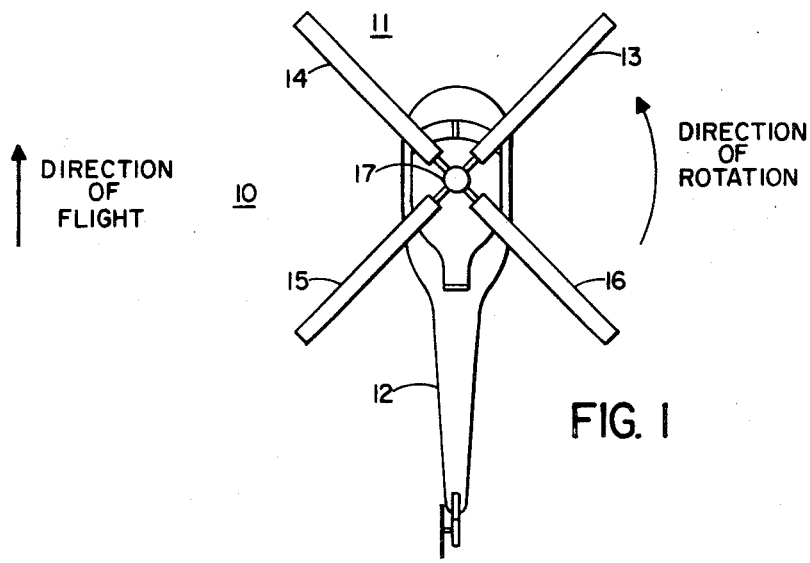
FIG. 1 is a top view of a helicopter in flight.

In FIG. 1 reference numeral 10 refers to a helicopter which comprises fuselage 12 and a rotor generally designated by reference numeral 11. Rotor 11 comprises rotor blades 13, 14, 15, and 16, in addition to rotor hub 17. For the indicated direction of flight of the helicopter and direction of rotation of the rotor, as viewed in FIG. 1, blades 13 and 16 are referred to as "the advancing blade," while blades 14 and 15 are referred to as "the retreating blade." Although helicopter 10 has a single main rotor comprising four blades, the problems involved with the rotors at high airspeeds described herein are associated equally with rotors having 2, 3, 4, or more blades, and with helicopters having more than one main rotor. Further, applicant's invention as described herein with reference to rotary-wing aircraft, is equally applicable to all rotary-wing aircraft regardless of number of main rotors, number of blades per rotor, or whether or not auxiliary fixed wings are employed.

Figure 2:
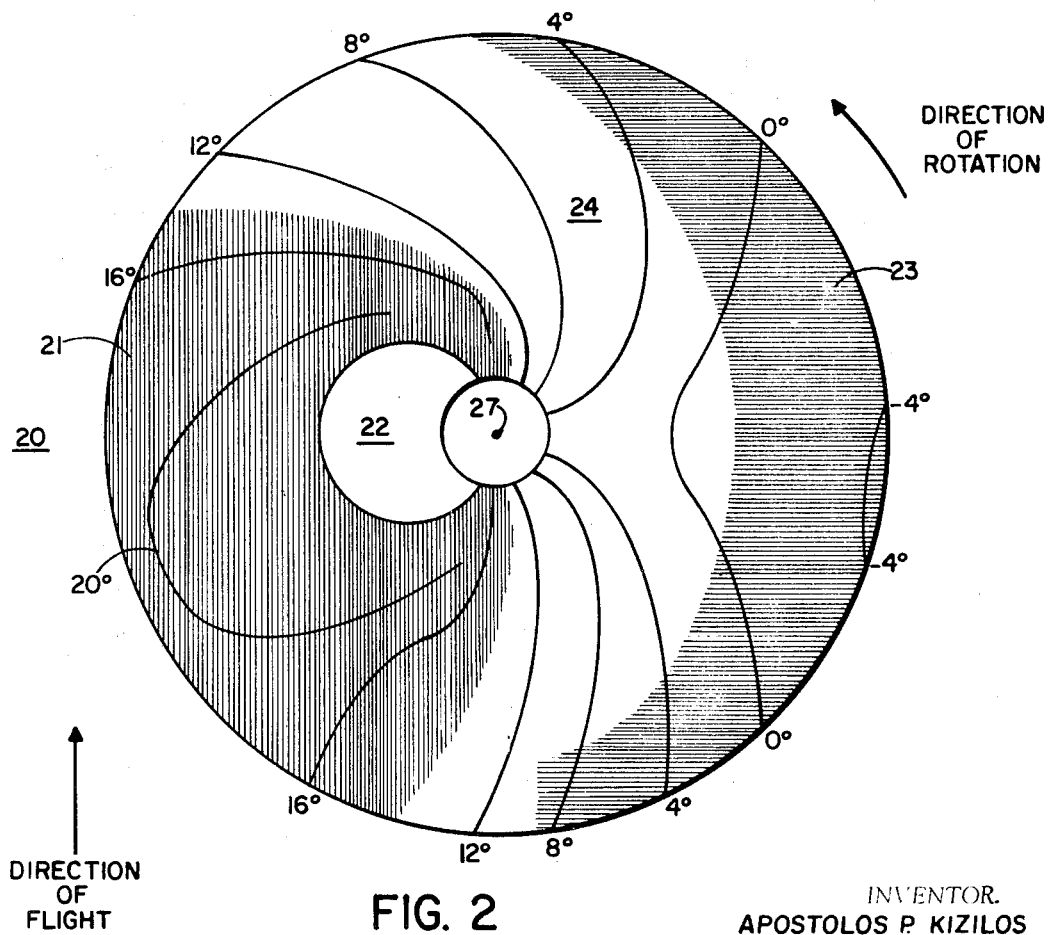
FIG. 2 is a diagram showing airflow conditions that exist across the rotor disc of a helicopter in flight.

In FIG. 2 reference numeral 20 generally refers to the rotor disc, i.e. the area swept by the rotating rotor blades of a rotary-wing aircraft, such as helicopter 10 of FIG. 1. Airflow conditions typically encountered on rotors at high airspeeds are shown on rotor disc 20. Lines showing angles of attack encountered across the rotor disc are identified by degree in FIG. 2. The higher angles of attack are experienced by the retreating blade on the left side of rotor disc 20. As has already been explained, blade stall is encountered at high angles of attack resulting in high drag and loss of lift. The exact angle of attack at which this occurs depends upon effective airspeed and blade profile, but usually occurs at about 14° as shown in FIG. 2. Shaded area 21 refers to that portion of rotor disc 20 wherein blade stall has occurred and little lift is produced. Unshaded area 22 is that part of rotor disc 20 wherein the retreating blade experiences reverse flow. As forward airspeed increases, reverse flow region 22 increases, growing outward from rotor hub 27.

Shaded area 23 designates that portion of rotor disc 20 wherein the tip of the advancing blade approaches the speed of sound, resulting in high drag, vibration and buffeting. As forward airspeed increases, region 23 increases, growing inward towards hub 27. Unshaded region 24 refers to the remainder of rotor disc 20 which is not disturbed by retreating blade stall and/or reverse flow, nor the advancing blade compressibility effects.

The conditions represented by FIG. 2 present problems that have not been overcome in the prior art, and that serve as a speed limit on rotary-wing aircraft.

Figure 3:
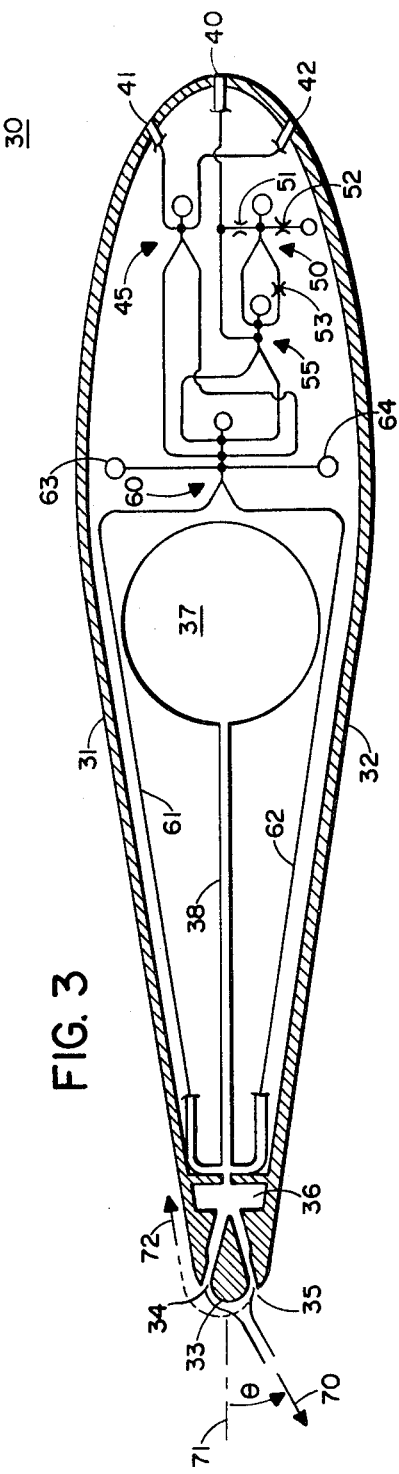
FIG. 3 is a cross section of an airfoil representing one embodiment of applicant's invention.

In FIG. 3 reference numeral 30 generally refers to a cross section of an airfoil employing one embodiment of applicant's invention. Airfoil 30 is defined by upper surface 31 and lower surface 32. At the trailing edge of airfoil 30, curved surface 33, upper slot 34, and lower slot 35 comprise variable deflection thruster jet flap means. Applicant's invention is not limited to the use of variable deflection thruster jet flap means; any type of jet flap means may be used.

The variable deflection thruster (hereinafter referred to as VDT), which is described in U.S. Pat. No. 3,367,581, is a particularly useful type of jet flap. It comprises two fluid outlet slots separated by an elongated curve surface. The VDT is mounted at the trailing edge of an airfoil. Fluid streams issuing from each slot attach to the curved surface due to the Coanda effect, and flow therearound to impinge on one another and combine to form a resultant fluid stream which departs from the curved surface in a direction determined by the relative momenta of the two fluid streams. Thus, the fluid sheet or jet flap produced by the VDT can be deflected through a large angle by varying the amount of fluid supplied to the two fluid outlet slots.

Fluid is supplied to upper slot 34 and lower slot 35 respectively by the upper and lower outlet passages of fluid amplifier 36. The use of a fluid amplifier for energizing and controlling the VDT is also described in U.S. Pat. No. 3,367,581. Alternate embodiments of applicant's invention might employ other fluidic, mechanical, or electromechanical valving means for supplying and controlling fluid flow to upper slot 34 and lower slot 35. Fluid is supplied to the power nozzle of fluid amplifier 36 by duct 37 and conduit 38. Duct 37 runs along the wing perpendicular to the plane of FIG. 3. It supplies suitable fluid for energizing jet flap means, such as compressor bleed air from turbine engines, hot gas from turbine exhaust, or other suitable energizing fluid. In other embodiments of applicant's invention, further valving means may be used on conduit 38 to control the total output of the VDT.

Inlet ports 40, 41, and 42 are provided at the leading edge of airfoil 30 for sensing airflow conditions thereat. Inlet port 40 is mounted on the leading edge, while inlet ports 41 and 42 are approximately equally spaced above and below it.

In this embodiment of applicant's invention, fluid amplifiers 45, 50, 55, and 60, together with connecting conduits and fluid amplifier 36, comprise control means for controlling the jet flap. The present invention is not limited to fluidic control means, but electronic or other suitable means may also be employed. In this embodiment fluid amplifiers 36 and 45 are proportional fluid amplifiers, fluid amplifiers 55 and 60 are summing proportional fluid amplifiers, and fluid amplifier 50 is a bistable fluid amplifier.

Inlet ports 41 and 42 are connected by conduit means to the upper and lower control ports, respectively, of fluid amplifier 45. The outlet passages of fluid amplifier 45 are connected by conduit means to the second pair of control ports of fluid amplifier 60; the upper outlet passage of fluid amplifier 45 is connected to the second upper control port of fluid amplifier 60, and the lower outlet passage of fluid amplifier 45 is connected to the second lower control port of fluid amplifier 60. Inlet port 40 connects via conduit means to the second upper control port of fluid amplifier 55, and via fluid resistor 51 to the upper control port of fluid amplifier 50. The upper outlet passage of fluid amplifier 50 is connected to the first upper control port of fluid amplifier 55. The lower outlet passage of fluid amplifier 50 is connected to the lower control port of fluid amplifier 55 through fluid resistor 53. The upper and lower outlet passages of fluid amplifier 55 are connected respectively to the upper and lower control ports of fluid amplifier 60 which comprises its first pair of control ports. The upper and lower outlet passages of fluid amplifier 60 are connected to the upper and lower control ports of fluid amplifier 36, respectively, by conduit means 61 and 62, respectively. The third pair of control ports of fluid amplifier 60 are connected to conduits 63 and 64, which in turn may be connected to a further source of fluid control signals, not shown, such as pilot or autopilot control means. The lower control port of fluid amplifier 50 is connected through fluid resistor 52 to a source of fluid pressure, not shown, which serves as a bias. Fluid at suitable working pressures is supplied to the power nozzles of fluid amplifiers 45, 50, 55, and 60 from a source of fluid now shown. For example, fluid from duct 37 may be used to energize the fluid amplifiers.

The operation of this embodiment of the applicant's invention will now be explained with reference to FIG. 3. Under normal flight conditions airflow passes around airfoil 30 from leading edge toward trailing edge in the normal manner. Under such conditions, the function of the VDT jet flap is to control the amount of lift produced by airfoil 30. As previously mentioned, and as explained in U.S. Pat. No. 3,367,581, the VDT can exert considerable influence over the airflow field around the airfoil 30. Specifically, when the VDT jet flap is directed downward relative to the airfoil cord as shown by arrow 70 which makes angle $\theta$ with respect to axis 71, airflow circulation around airfoil 30 is increased and the lift produced by airfoil 30 is increased by an amount that depends upon the strength and the angle $\theta$ of the VDT jet flap. If the VDT is operated at an angle $\theta$ nearly 0° with respect to axis 71, little or no lift is produced, and negative lift is produced when the VDT jet flap is deflected upwards. Thus the amount of lift produced by airfoil 30 can be controlled by varying the angle $\theta$ of the VDT.

As an example of the operation of the VDT, assume that a pressure differential signal is applied to conduits 63 and 64, with the positive pressure being applied to conduit 63. This would correspond to a control signal input from the pilot's controls or the autopilot commanding an increase in lift. Neglecting momentarily the inputs at the first and second pair of control ports of fluid amplifier 60, the higher pressure at the third upper control port of fluid amplifier 60 with respect to the pressure in the third lower control port of fluid amplifier 60 causes a proportional increase in the fluid flow through the lower outlet passage of the amplifier. This causes an increase in pressure in the lower control port of fluid amplifier 36, which in turn causes a proportional increase in flow through slot 34 and decrease in flow through slot 35. The change in relative flow through slots 34 and 35 causes the point of impingement of the two streams to shift towards slot 35 and causes an increase in angle $\theta$. The increase in angle $\theta$ results in the production of greater lift, as previously explained, which is the desired result.

The pressures sensed at inlet ports 41 and 42 are applied to the control ports of fluid amplifier 45. Thus, the output signal of fluid amplifier 45 is proportional to the pressure differential that exists between upper surface 31 and lower surface 32, and is related to the effective angle of attack experienced by airfoil 30. Other embodiments of applicant's invention may use a plurality of inlet ports along the upper and lower surfaces of the airfoil to measure differences in pressure therebetween, which are indicative of the lift produced by the airfoil rather than the angle of attack.

In a manner analogous to the operation of pilot or autopilot control inputs through conduits 63 and 64, the pressure differential signal applied to the second pair of control ports of fluid amplifier 60 from the outlet passages of fluid amplifier 45 is effective to control the angle $\theta$ of the VDT jet flap, according to the difference in pressure or angle of attack sensed at inlet ports 41 and 42. It will be appreciated that in other embodiments of applicant's invention, fluidic elements in addition to fluid amplifier 45 may be added to the control circuit in order to provide wave shaping or scaling as may be required. Further, it will be appreciated that the use of other fluidic, mechanical, or electromechanical means for sensing angle of attack or difference in pressure between upper and lower airfoil surfaces is within the scope of the present invention.

Inlet port 40 senses the dynamic pressure $q$ experienced by the leading edge of airfoil 30. The control means of this embodiment of applicant's invention uses dynamic pressure $q$ as an input for controlling the VDT jet flap as follows: At low airspeed, where the dynamic pressure $q$ is small, the operation of fluid amplifiers 50, 55, 60, and 36 together with associated circuitry causes the jet flap to be deflected downward i.e. causes $\theta$ to be large. At low airspeeds airfoil 30 is therefore capable of producing lift while a conventional airfoil would be in stalled condition. As airspeed increases, the control means of applicant's invention causes the angle $\theta$ of the jet flap to decrease in proportion with the increasing $q$, because less downward blowing of the VDT jet flap is required to produce a given amount of lift as airspeed increases.

If airfoil 30 is part of a rotor blade for a rotary-wing aircraft, and if airfoil 30 is in a region of reverse flow, air will flow around airfoil 30 from trailing edge towards leading edge. Under such a condition, the dynamic pressure $q$ sensed at inlet port 40 will be substantially zero. When this occurs, the control means in applicant's invention functions to cut off the flow through slot 34, and direct all the flow from fluid amplifier 36 to slot 35. In so doing, applicant's invention takes advantage of the bidirectional capability of the VDT to produce a jet or sheet of fluid which wraps around curved surface 33 and along upper surface 31 as indicated by arrow 72.

It is known that an airfoil such as airfoil 30 is capable of producing some lift, although relatively inefficiently and with much adverse buffeting, when operated in reverse flow. Applicant's invention, by directing the VDT jet flap across the upper surface of the airfoil as indicated by arrow 72, in effect operates to produce "leading edge" blowing which increases circulation around the airfoil in the reverse sense to smooth the airflow and increase the amount of lift produced. When the jet flap is in the direction of arrow 72, its direction is fixed, but control of circulation is still possible by varying the amount of blowing from the VDT by additional valving means previously mentioned but not shown.

To effect the results above described, the control means of this embodiment of applicant's invention operates as follows: When the dynamic pressure $q$ is substantially zero, bias pressure applied to the lower control port of bistable amplifier 50 through fluid resistor 52 causes the total output to pass through the upper outlet passage of bistable amplifier 50 and into the first upper control port of proportional fluid amplifier 55. This causes the entire output of fluid amplifier 55 to pass through the lower outlet passage and into the first lower control port of fluid amplifier 60. Such a pressure applied to a lower control port of fluid amplifier 60 causes its total output to flow out its upper outlet passage, along conduit 61, and into the upper control port of fluid amplifier 36, which is effective to deflect the output of the VDT upward around curved surface 33 along path 72 as previously described.

For small positive values of $q$, the pressure at the upper control port of fluid amplifier 50 exceeds the bias pressure applied to the lower control port, causing flow to switch to the lower outlet passage, through resistor 53, and into the lower control port of fluid amplifier 55. The pressure thus applied to the lower control port of fluid amplifier 55 is opposed by, but exceeds, the dynamic pressure $q$ applied to the second upper control port of fluid amplifier 55. The pressures thus applied to the control port of fluid amplifier 55, acting through fluid amplifiers 55, 60, and 36 cause the VDT jet flap to be deflected downward to a relatively large angle $\theta$. The value of the angle $\theta$ depends upon the value of resistance 53 and upon the gains of fluid amplifiers 55, 60, and 36. As dynamic pressure $q$ increases, the pressure applied to the second upper control port of fluid amplifier 55 likewise increases, while the pressure applied to the lower control port of fluid amplifier 55 remains constant, since it represents the total output of fluid amplifier 50. The increasing pressure $q$ applied to the upper control port of 55, acting through fluid amplifiers 55, 60, and 36, produces a proportional decrease in the angle $\theta$ of the VDT jet flap. That is, at higher forward airspeeds of airfoil 30, where less downward blowing of the jet flap is required to produce a given amount of lift, the operation of the control means causes the downward angle of the jet flap to be reduced.

In other embodiments of applicant's invention, control of the VDT for reverse flow flowing might be effected other than by sensing dynamic pressure $q$. For example, the control means of applicant's invention could direct the VDT upward across the upper surface of the airfoil when preprogrammed values of airspeed and rotor azimuthal position are reached.

Figure 4:
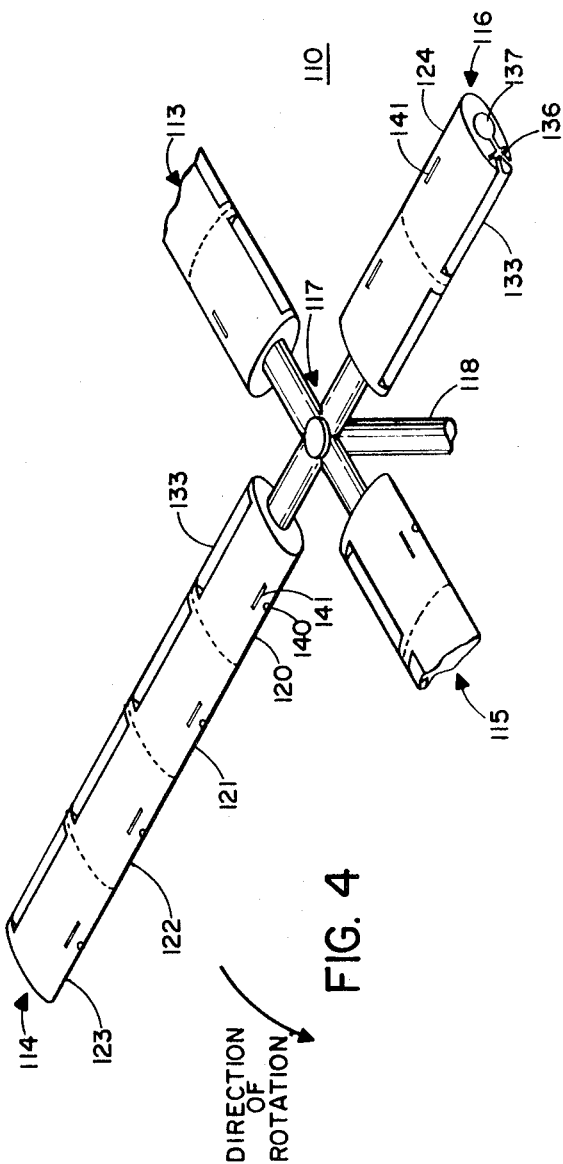
FIG. 4 is a helicopter rotor employing one embodiment of applicant's invention.

In FIG. 4, reference numeral 110 generally refers to a rotor for a helicopter or other rotary-wing aircraft. Rotor 110 comprises rotor shaft 118, rotor hub 117, and rotor blades 113, 114, 115, and 116. Each rotor blade is divided into a number of spanwise sections, as suggested by the dotted lines.

For example, rotor blade 114 is shown in FIG. 4 as being made up of sections 120 thru 123, which are substantially identical to section 30 of FIG. 3, and which are joined end on end. Other embodiments of applicant's invention might employ a rotor blade constructed as a single unit, but with internal partitions to divide the sections. Or, a single unit blade may merely have sensing means and/or jet flap means distributed spanwise along its length. The blade need only be sectionalized in the sense that it includes means for sensing and modifying airflow conditions locally at various spanwise positions.

In rotor 110, reference numeral 133 generally refers to VDT means mounted at the trailing edge of each section. Each section also has inlet ports 140, 141, and 142 (not shown). As shown on section 124 of rotor blade 116, each section also includes duct 137 and fluid amplifier 136. In addition each section includes control means as described above with reference to FIG. 3.

The embodiment of applicant's invention shown in FIGS. 3 and 4 effectively overcomes the previously mentioned problems associated with rotors at high speeds. Because higher lift coefficients are obtainable with jet flap airfoils than with conventional airfoils, rotor 110 of FIG. 4 may produce the same amount of lift as a conventional rotor having larger diameter and/or higher rotational velocity. Since rotor 110 is smaller in diameter and/or operates at a lower rotational velocity than a conventional rotor of equivalent lifting capability, clearly the problem of the advancing blade tip approaching the speed of sound is alleviated, allowing a helicopter equipped with rotor 110 to attain higher airspeeds than a similar helicopter equipped with a conventional rotor.

It will be recalled that slowing the rotor's rotational velocity to reduce the effective airspeed of the advancing blade tip tends to aggravate retreating blade stall and the growth of the region of reverse flow, which in the case of conventional rotors serves to further restrict maximum helicopter airspeed. However, the problems of retreating blade stall and reverse flow have effectively been solved by applicant's invention.

Through operation of the control means previously described, each section of each blade of rotor 110 is able to automatically adjust its own VDT jet flap to produce the desired amount of lift, so that rotor 110 continues to produce lift which is substantially uniform across the rotor disc, even at high helicopter airspeeds. For example, assume that FIG. 4 represents an instant of time in which blade 114 is the retreating blade. Depending upon helicopter airspeed, section 120 may be in a region of reverse flow, while sections 121, 122, and 123 are in a region of low effective airspeed. The jet flap of section 120 will be blowing upwards across the top of the blade, while the jet flap of section 121 is blowing downwards at a large angle $\theta$, the jet flap of section 122 at a slightly smaller angle $\theta$, and while the jet flap of section 123 is blowing downward at a still smaller angle $\theta$. Or, at higher helicopter airspeed, both sections 120 and 121 may be in the reverse flow region, and their jet flaps may both be blowing upwards across the top of the blade. At still higher speeds, it is possible that all four sections 120—123 may be blowing upward across the top of the blade. Thus, reverse flow and/or retreating blade stall as limits to maximum helicopter airspeed are effectively overcome by applicant's invention.

As rotor 110 continues to rotate through its cycle, section 120 will pass out of the region of reverse flow, to a region of low effective airspeed. When this occurs, the small but positive dynamic pressure $q$ will be sensed at inlet port 140 and the VDT jet flap of section 120 will be deflected downward at a large angle $\theta$. In this manner each section of the blades automatically compensates for varying conditions it experiences throughout the rotation cycle.

Another advantage of applicant's invention is that cyclic and collective control of rotor lift which is necessary for helicopter control may be obtained by summing of appropriate pilot or autopilot control signals to the control means of each blade section, as has already been suggested. By so doing, the need for pitch axis articulation of the rotor blades is eliminated, and a truly rigid rotor may be employed. Such a rigid rotor and hub would be cheaper, more reliable, and less subject to vibration than conventional articulated rotor and swash plate assemblies.

A further advantage of applicant's invention as applied to rotary-wing aircraft is that it enables the aircraft, for short periods of time, to lift loads that far exceed its normal lifting capability. Although it is too inefficient for normal use, for short periods of time an auxiliary compressor may be used to supply additional pressure to the jet flap means, so that supercirculation is achieved about the rotor blades. This might be useful, for example, in a heavy lifting helicopter to allow it to lift extraordinarily heavy objects.

I claim:
1. In a rotary-wing aircraft:
a rotor comprising a plurality of sectionalized rotor blades;
sensing means located in sections of said rotor blades for producing signals indicative of airflow conditions therearound;
fluid outlet means located in sections of said rotor blades for issuing fluid streams so as to form a jet flap;
means for connecting said fluid outlet means to a fluid supply; and
control means located in sections of said rotor blades and connected to said sensing means and said fluid outlet means, said control means operable to vary the flow of fluid from said fluid outlet means in accordance with said signals, thereby controlling the lift produced by the sections of said rotor blades.

2. Apparatus of claim 1 wherein said sensing means includes means for sensing pressure differentials between upper and lower surfaces of the rotor blade sections.

3. Apparatus according to claim 1 wherein said fluid outlet means comprises variable deflection thruster means located at the trailing edge of said sections of said rotor blades.

4. Apparatus according to claim 3 wherein said control means includes fluidic amplifiers.

5. Apparatus according to claim 3 wherein said sensing means includes means for sensing a condition of reverse flow across sections of said rotor blades, and wherein said control means includes means for causing said variable deflection thruster means to direct said jet flap across the top of said sections from trailing edge to leading edge when said sections are in a region of reverse flow.

6. Apparatus of claim 1 further including means connected to said control means for supplying control signals indicative of pilot commands thereto, and wherein said control means are adapted to vary the flow of fluid from said fluid outlet means according to said control signals, thereby controlling the lift produced by said rotor.

7. In a rotor for a rotary-wing aircraft:
a rotor blade having a plurality of spanwise sections;
fluid outlet means located in sections of said rotor blade for issuing fluid streams so as to form a jet flap;
means for connecting said fluid outlet means to a fluid supply;
signal means for producing signals indicative of airflow conditions at individual sections of said rotor blade; and
control means associated with at least some of said sections of said rotor blade and connected to said signal means and said fluid outlet means, said control means for varying the flow of fluid from said fluid outlet means according to said signals so as to vary said jet flap, thereby varying the lift produced by the sections of said rotor blade.

8. Apparatus of claim 7 wherein said signal means includes means for measuring lift produced along individual sections of said rotor blade.

9. Apparatus of claim 7 wherein said fluid outlet means includes variable deflection thruster means at the trailing edges of individual sections of said rotor blade.

10. Apparatus according to claim 9 wherein said sensing means includes means for sensing a condition of reverse flow across sections of said rotor blade, and wherein said control means includes means for causing said variable deflection thruster means to direct said jet flap across the top of sections of said rotor blade from trailing edge to leading edge when the sections are in a region of reverse flow.